US008293035B2

(12) United States Patent
Zurecki et al.

(10) Patent No.: US 8,293,035 B2
(45) Date of Patent: *Oct. 23, 2012

(54) TREATMENT METHOD, SYSTEM AND PRODUCT

(75) Inventors: Zbigniew Zurecki, Macungie, PA (US); Christopher Alan Ward, Alburtis, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 479 days.

This patent is subject to a terminal disclaimer.

(21) Appl. No.: 11/870,928

(22) Filed: Oct. 11, 2007

(65) Prior Publication Data
US 2008/0087359 A1    Apr. 17, 2008

Related U.S. Application Data

(60) Provisional application No. 60/851,197, filed on Oct. 12, 2006.

(51) Int. Cl.
*C21D 11/00* (2006.01)
*B05D 1/02* (2006.01)

(52) U.S. Cl. ......................... 148/511; 427/8

(58) Field of Classification Search ............... 148/511; 427/8, 446
See application file for complete search history.

(56) References Cited

U.S. PATENT DOCUMENTS

| | | | |
|---|---|---|---|
| 3,862,857 A | 1/1975 | Gambino | |
| 5,413,164 A | 5/1995 | Teshima et al. | |
| 6,648,053 B2 | 11/2003 | Allor et al. | |
| 6,740,624 B1 | 5/2004 | Hoste et al. | |
| 6,945,306 B2 | 9/2005 | Duncan et al. | |
| 2001/0033952 A1 | 10/2001 | Jenson et al. | |
| 2004/0020624 A1* | 2/2004 | Duncan et al. | 164/46 |
| 2006/0228465 A1* | 10/2006 | Zurecki | 427/8 |
| 2007/0049044 A1 | 3/2007 | Marsh | |

FOREIGN PATENT DOCUMENTS

| | | |
|---|---|---|
| EP | 0 960 955 A1 | 12/1999 |
| EP | 1 038 987 B1 | 12/2003 |
| EP | 1381732 B1 | 9/2006 |

(Continued)

OTHER PUBLICATIONS

Nuse, J.D., et al., "Surface Finishing of Tungsten Carbide Cobalt Coatings Applied by HVOF for Chrome Replacement Applications", Aerospace/Airline Plating and Metal Finishing Forum, Mar. 27, 2000, pp. 1-12, Cincinatti, OH.

(Continued)

*Primary Examiner* — Scott Kastler
(74) *Attorney, Agent, or Firm* — Anne B. Kiernan

(57) ABSTRACT

A process for treating a workpiece having the steps of: altering the temperature of a workpiece surface wherein at least one condition selected from the group of: thermal treatment rate, relative motion between the surface and said thermal treatment rate, coolant flow rate onto said surface, heating flow rate onto said surface and the relative speed between the heating means or the cooling means and the surface is controllable; simultaneously measuring temperatures at a plurality of locations over the surface of the workpiece; determining an average temperature of the temperatures measured; comparing the average temperature to preselected minimum and maximum temperatures for the workpiece; and automatically adjusting at least one of, the controllable conditions if said average temperature is not between the preselected minimum and maximum temperatures for the workpiece. A system for performing a thermal treatment process and the resulting product are also provided.

25 Claims, 8 Drawing Sheets

FOREIGN PATENT DOCUMENTS

| | | | |
|---|---|---|---|
| EP | 1 712 962 A1 | 10/2006 |
| FR | 2 211 544 A | 7/1974 |
| GB | 998 239 A | 7/1965 |
| JP | 2004-512941 A | 4/2004 |
| WO | 8912116 | 12/1989 |
| WO | 98-26104 A1 | 6/1998 |
| WO | 99/01674 A1 | 12/1999 |
| WO | 99/61674 A1 | 12/1999 |
| WO | 02/083971 A1 | 10/2002 |
| WO | 02/083972 A1 | 10/2002 |
| WO | 03035322 | 1/2003 |
| WO | 2006/115530 A | 11/2006 |

OTHER PUBLICATIONS

Stokes, J., et al., "HVOF System Definition to Maximise the Thickness of Formed Components", Proceedings of the International Conference on Advances in Materials and Processing Technologies (AMPT '99). Dublin, Ireland, Aug. 3-6, 1999, pp. 775-784.

Lucchese, P., et al., "Optimization of Robotic Trajectories in the Atmosphere and Temperature Controlled Plasma Spray Process on Ceramic Substrate Using Heat Flow Modelling", Proceedings of the 1993 National Thermal Spray Conference, Jun. 7-11, 1993, pp. 231-239, Anaheim, CA.

U.S. Appl. No. 60/851,197, filed Oct. 12, 2006; "Thermal Deposition Surface Treatment Method, System and Product".

Duncan, S.R., et al; "Control of Temperature Profile for a Spray Deposition Process"; IEEE Transactions on Control Systems Technology, IEEE Service Center; New York, NY; vol. 11, No. 5; Sep. 1, 2003; pp. 656-667; XP-011100691.

Jones, et al; "Control of Temperature Profile for a Spray Deposition Process"; IEEE Transactions on contorl systems technology; Sep. 2003; vol. 11, No. 5; pp. 656-667.

Jones, P., et al; "Estimating the Surface Temperature Profile from a Sequence of Partial Thermal Images"; Proceedings of the SPIE, The International Society for Optical Engineering SPIE-INT. Soc. Opt. Eng USA; vol. 4571, 2001, pp. 199-207, Dec. 2001.

Pathirana, P., et al, "Control of average temperature in a spray deposition process"; IEEE Conference on Control Applications—Proceedings 2002; vol. 2, 2002, pp. 1004-1009, Dec. 2002.

* cited by examiner

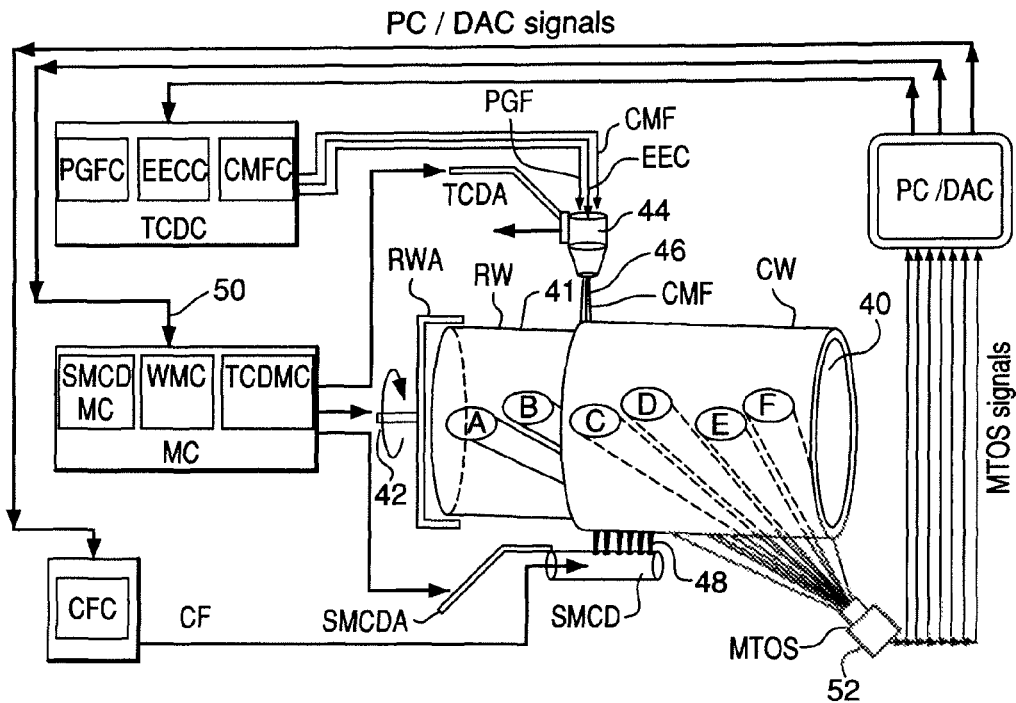

SMCD - stationary or moving coolant distributor
A,B,...F - temperature control areas
RW - rotating workpiece
CW - coated section of workpiece
MTOB - multipoint optical thermal sensor
PC / DAC - computer data acquistion and control
TCDC - thermal coating device controller
CMFC - coating material flow controller
EEC - electric energy circuit
EECC - electric energy circuit controller PGF - process gas flow
PGFC - process gas flow control
CF - coolant flow
CFC - coolant flow controller
TCDA - thermal coating device actuator or holder
SMCDA - coolant distributor actuator or holder
RWA - workpiece actuator or holder
MC - motion controller
WMC - workpiece motion controller
TCDMC - thermal coating device motion controller
SMCDMC - coolant distributor motion contoller

FIG. 4

FIG. 7: Temperatures During Cryo-cooled HVOF Coating Operation

TREATMENT METHOD, SYSTEM AND PRODUCT

This application claims priority provisional application 60/851,197, filed Oct. 12, 2006, entitled "Thermal Deposition Surface Treatment Method, System and Product", which is incorporated in its entirety herein by reference.

BACKGROUND OF THE INVENTION

Processes for applying various coatings such as metallic, alloy, ceramic and composite to a variety of substrates to form component products using thermal deposition coating methods are known. Such processes are employed to improve properties of the substrate such as hardness, corrosion resistance, heat resistance surface porosity and the like. Exemplary thermal deposition coating operations include: high-velocity oxy-fuel spraying (HVOF) and high-velocity air-fuel spraying (HVAF), DC and RF plasma spray in air atmosphere, vacuum chamber and/or inert gas chamber, electric arc (twin and single wire) spraying, laser powder coating or cladding, transferred arc coating operations such as plasma transferred-arc powder coating and welding overlay deposition, and so forth.

Thermal deposition coating operations deposit a preheated and/or molten coating material onto the surface of a substrate. In the coating process, multiple passes of a thermal deposition head are made over the surface of the workpiece each pass depositing a layer of coating material. A significant amount of energy, typically manifested as heat, is required to thermally deposit the coating material onto the workpiece and a portion of this energy is at least partially carried to the workpiece. Improper temperature control during thermal deposition frequently, leads to coating and workpiece overheating, thermal degradation, and damaging thermal stresses due to a mismatch of thermal contraction coefficients between the coating and substrate surface. When damage occurs through overheating, thermal stress and the like, the resulting coatings may be poorly adhering, or even fractured.

Similar problems with non-optimal and/or non-uniform temperature distribution of surface treated components can take place during coating post-treatments, e.g. the conventional flame, laser, plasma, or induction field fusing or glazing of previously spray-deposited coatings in order to close microporosity and densify these deposits.

Heat removal from the workpiece during thermal deposition coating is critical and one of the most popular ways of practicing heat removal during the thermal deposition coating operation is to introduce breaks in the process cycle so that the accumulated heat is dissipated to the surroundings. Cooling air jets are often used to offset the loss of process productivity due to such a practice but (a) air cooling is usually insufficient and (b) the oxygen along with residual moisture and hydrocarbons present in the cooling air often are detrimental to the quality of coating.

The search for effective heat removal methods in terms of coolants for maximizing coating quality in the resulting component and/or process productivity led to the development of refrigerated and cryogenic gas cooling. While cryogenic cooling methods offer a significant enhancement in the ability to remove heat fast, they are rarely used in the thermal deposition coating industry because of an even further increased difficulty, or a narrower margin for error, in controlling temperature, i.e., heat build-up and thermal uniformity within the workpiece during coating.

Difficult to achieve in the industrial conditions with the conventional approaches, tight control of substrate surface temperature is, nevertheless, critical for maximizing the thickness of coatings and/or adhesion of these coatings to substrate surface.

Representative articles and patents illustrating thermal deposition coating processes some including the use of cryogenic coolants are as follows:

Nuse, J. D. and Falkowski, J. A. *Surface Finishing of Tungsten Carbide Cobalt Coatings Applied by HVOF for Chrome Replacement Application*, Aerospace/Airline Plating and Metal Finishing Forum, Cincinnati, Ohio, Mar. 27, 2000, disclose the use of HVOF for the application of tungsten carbide coatings in nose and landing gear substrates for aircraft as a replacement for chrome based coatings.

Stokes, J. and Looney, L., *HVOF System Definition to Maximise the Thickness of Formed Substrates*, Proceedings of the International Conference on Advances in Materials and Processing Technologies (AMPT '99), Dublin, Ireland, 3-6$^{th}$ Aug. 1999, pp. 775-784, disclose the use of HVOF to apply alumina-calcia stabilized zirconia deposits, CoNiCrAlY deposits and carbide deposits using carbon dioxide as a coolant. The effects of spray distance and forced cooling were determined.

Lucchese, P., et al., *Optimization of Robotic Trajectories in the Atmosphere and Temperature Controlled Plasma Spray Process on Ceramic Substrate Using Heat Flow Modelling*, Proceedings of the 1993 National Thermal Spray Conference, Anaheim, Calif., 7-11 Jun. 1993, pp. 231-239 disclose the use of atmosphere and temperature controlled plasma spraying using liquid argon as a coolant. A refractory powder was sprayed on a rotatable ceramic workpiece with a robotic trajectory. A recording IR camera positioned in the plasma spraying area was used to measure temperature verses time and use those results to reduce heat fluxes and avoid substrate and coating destruction.

U.S. Pat. No. 6,740,624 B1 and EP 0 960 955 A1) disclose a method for providing a coating of metal oxides onto a substrate at thicknesses of generally greater than 5 mm by flame or plasma spraying. Cryogenic cooling of the back side of the substrate is performed during thermal spraying. The use of a single-point infrared sensor associated with a single-point cryogenic coolant source is suggested with the additional option of multiplying such sensor-cryogen source couples over the substrate surface.

U.S. Pat. No. 6,648,053 B2, WO 02/083971 A1, WO 02/083972 A1 and EP 1 038 987 B1, disclose the use of coolant-free, sensed surface temperature-based thermal control methods and apparatus for an electric arc-spray-forming of thick deposits (billets) in an automated spray cell using a thermally insulating ceramic substrate, characterized by reduced distortion and internal stresses. The disclosed surface temperature sensing is based on real-time, two-dimensional mapping of spray-deposited surface using a multi-point measurement, thermographic or thermo-imaging (thermo-vision) camera.

The process control algorithm synchronizes the thermographic camera coordinates with the robotic sprayer coordinates, and when hot spots develop on the surface of the workpiece such hot spots are eliminated by controlling the amount of material sprayed on these hot spot areas by manipulation of the traverse speed and positioning of the robotic spray-forming gun.

BRIEF SUMMARY OF THE INVENTION

This invention relates to processes and systems for the thermal treatment of a surface of a workpiece comprising the steps of:

(a) altering the temperature of a workpiece surface wherein at least one condition selected from the group of: thermal treatment rate, relative motion between the surface and said treatment means, coolant flow rate onto said workpiece, heating flow rate onto said workpiece and the relative speed between the heating means or the cooling means and the surface is controllable;

(b) simultaneously measuring temperatures at a plurality of locations over the surface of the workpiece;

(c) determining an average temperature of the temperatures measured in step (b);

(d) comparing the average temperature to a preselected minimum temperature and a preselected maximum temperature for the workpiece; and (e) automatically adjusting at least one of the controllable conditions if said average temperature is not between the preselected minimum temperature and the preselected maximum temperature for the workpiece. This step is performed while continuing to perform the altering step, and then the process steps are repeated.

The invention further provides processes for treating a workpiece, said processes comprising the steps of:

(a) altering the temperature of a workpiece surface wherein at least one condition selected from the group of: thermal treatment rate, relative motion between the surface and said thermal treatment means, coolant flow rate onto said surface, heating flow rate onto said surface and the relative speed between the thermal treatment means and the surface is controllable;

(b) dividing the surface of the workpiece into a plurality of zones;

(c) simultaneously measuring temperatures at a plurality of locations in a plurality of zones over the surface of the workpiece wherein at least one temperature is measured in each zone;

(d) determining an average temperature in each of said plurality of zones using said temperatures measured in step (c);

(e) comparing each of the average temperatures to a preselected minimum temperature and a preselected maximum temperature for the zone; and (f) automatically adjusting at least one of the controllable conditions if said average temperature is not between the preselected minimum temperature and the preselected maximum temperature for at least one of the zones.

In other embodiments of the invention, local stresses are minimized in the workpiece that are typically caused by non-uniform temperatures between various portions of the workpiece which may be due to one or more of the following: workpiece geometry, non-optimum coolant application, non-optimum heating application, non-optimum altering the temperature of the workpiece and heating means, cooling means or thermal treatment means that are small relative to the size of the workpiece, or other, unoptimized parameters of the thermal process. This may be accomplished by calculating the standard deviation of all temperature readings for the already described embodiments and controlling the relative motion (speed) between the thermal treatment means and the workpiece, and/or the thermal treatment rate (which may be heating treatment rate or cooling treatment rate) and/or the coolant flow rate, and/or the heating flow rate in response to predetermined values for the standard deviation. Another embodiment includes the steps (a) to (e) or (f) above and the additional steps of:

(f or g) determining the standard deviation between said average temperature and a cumulation of said measured temperatures;

(g or h) comparing the standard deviation to a first preselected standard deviation, S1; and (h or i) automatically adjusting at least one of the controllable conditions if said standard deviation is greater than the first preselected standard deviation, S1. This step is performed while continuing to alter the temperature of the surface of the workpiece. Then the process steps are repeated.

In another embodiment of this invention is included the additional steps of:

(i or j) comparing the standard deviation to a second preselected standard deviation, S2; and (j or k) automatically suspending or limiting the altering of the temperature of the workpiece if said standard deviation is greater than a second preselected standard deviation, S2. Steps (i or j) and a or k) may be performed before or after steps (g or h) and (h or i). Then the process steps may be repeated. If the altering step is suspended then steps (b) through steps a or k) or steps (b) through (e) and (i or j) and (j or k) are repeated until the standard deviation is less than S2, and then all the steps may be repeated until the thermal process is complete.

This invention further provides a system comprising:

a. a thermal treatment means to alter a temperature of a surface of a workpiece and a controller for said thermal treatment means;

b. workpiece holder for holding the workpiece;

c. motion controller for moving said thermal treatment means relative to said workpiece holder;

d. at least one temperature sensor that can simultaneously measure temperatures at a plurality of locations over the surface of the workpiece;

e. computer that receives the input from the at least one of the temperature sensors and determines an average temperature of the temperatures; compares the average temperature to a preselected minimum temperature and a preselected maximum temperature for the workpiece; and automatically communicates with at least one of the controllers if said average temperature is not between the preselected minimum temperature and the preselected maximum temperature for the workpiece.

This invention further provides a system that divides a workpiece into zones and measures at least one temperature in each zone. In some embodiments of the system, multiple temperature sensors or measurement locations (for a single temperature sensor able to measure an output simultaneously at multiple locations) are provided for each zone to calculate (determine) an average temperature for that zone. In other embodiments of the system of the invention, there is provided at least one temperature measurement per zone and at least one additional temperature measurement measured in an area that is at least partially in an adjacent zone. That at least one additional temperature measurement may be a temperature measured in an area (area, point or location) that is fully within a zone that is adjacent to the zone for which the average temperature is being calculated, or it may be a temperature measurement that is an average temperature over an area that is within at least two or more adjacent zones, one zone of which is the zone for which the average temperature is being calculated.

This invention also provide the workpieces resulting from any of the processes described herein.

Advantages can be achieved based on using the thermal treatment processes and systems of this invention and may include one or more of the following:
an ability to achieve excellent production rates without the risk of overheating and thermally damaging the workpiece material, or underheating and thermally damaging the coating material, or not achieving the desired effect on the substrate material; an ability if coating to produce well adhering, uniform coatings on workpieces while minimizing damaging internal stresses between the coating and the surface in the coated workpiece; an ability to provide temperature control for difficult to control operations optionally involving coolants or heating means, which may also include simplicity of implementation in production environment, reliable thermal measurement in spite of various momentary process upsets, and acceptance of both contact and non-contact sensor measurement; and, an ability to employ mixed inputs from differing temperature sensing devices.

BRIEF DESCRIPTION OF THE DRAWINGS

FIG. 4 is a system which can be used in process of this invention showing one embodiment of a thermal deposition coating, cryogenic cooling, and control system for a cylindrical workpiece.

DETAILED DESCRIPTION OF THE INVENTION

Figure 1:
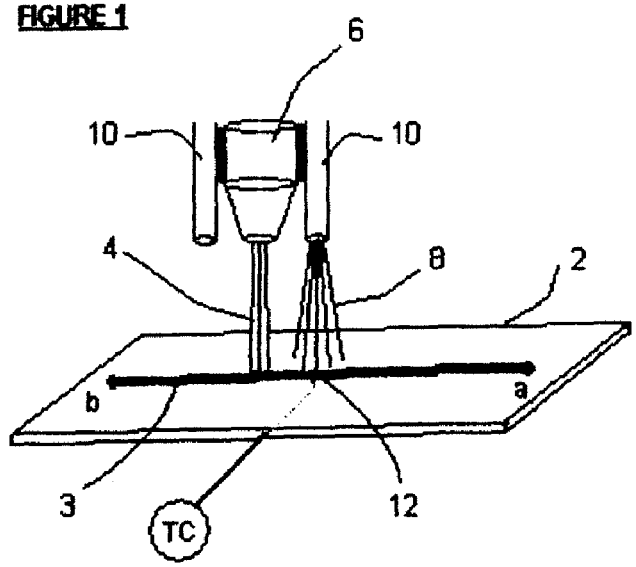
FIG. 1 is a view of a simplified, reciprocal thermal deposition coating operation illustrating single point temperature measurement.

The processes and systems of this invention are useful in any process or system for the thermal treatment of a workpiece in which underheating or overheating and/or nonuniformly heating or cooling of a workpiece (or a coating on the workpiece) has a detrimental effect on the workpiece or the coating. A thermal treatment process is a process in which the temperature of the workpiece is altered, that is a workpiece is heated and/or cooled while trying to change the properties or add a coating to a workpiece and it is desirable to keep the temperature of the workpiece within a desired range. The heating or cooling of the workpiece during the thermal treatment process alone may result in the desired treatment of the surface of the workpiece, or other gases, fluids or materials may be introduced onto the surface of the workpiece as part of the thermal treatment process to achieve the desired surface modifications. In some embodiments of the thermal treatment process of this invention, the heating and/or cooling of the workpiece is performed by a heating treatment means, cooling treatment means, heating means or cooling means that results in nonuniform heating and cooling of the workpiece. In addition to thermal spray coating, examples of thermal treatment methods that involve or result in altering the temperature of a workpiece include heat-treating, chemical and physical vapor deposition coating, thermal treatment of the surface, fusing, hardening, nitriding, carburizing, induction heat-treating, laser glazing, heat-facing and heat-shielding surfaces, molding and other methods of casting, extrusion metal strip rolling, forging, forming, induction heat treating, joining, brazing, welding, and thermal cutting operations as well as printing and curing of non-metallic materials, cool rolling, cryogen treatment of surfaces, machining and metal cutting. Examples of the deposition coating operations include: high-velocity oxy-fuel spraying (HVOF) and high-velocity air-fuel spraying (HVAF), DC and RF plasma spray in air atmosphere, vacuum chamber and/or inert gas chamber, electric arc (twin and single wire) spraying, laser powder coating or cladding, transferred arc coating operations such as plasma transferred-arc powder coating and welding overlay deposition.

The thermal treatment means may be either a heating treatment means or a cooling treatment means and can be any of the devices necessary for any of the just-described thermal treatment processes disclosed herein. The thermal treatment means include the following: thermal deposition heads, thermal spraying guns (and includes HVOF, APS, VPS, arc-spray, flame, etc.) as well as MIG welding torches, lasers, flames, plasma discharge, electric arc welding torch, cryogenic nozzles, machining equipment. Many of the just described thermal treatment means alter the temperature of the surface of the workpiece by depositing high temperature materials onto the surface of the workpiece.

The inventions are useful in thermal treatment processes of a workpiece in which the workpiece has to be maintained below a maximum temperature and above a minimum temperature which can include the steps of preheating and/or heating the surface of the workpiece by a heating means to maintain the temperature above a minimum temperature, and/or precooling to and/or cooling the surface of a workpiece by a cooling means to maintain the temperature below a maximum temperature during a thermal treatment process. The thermal treatment process of this invention is described in detail with reference to a thermal deposition treatment of a workpiece; however, the invention is not limited to a thermal deposition treatment process and system. Any reference to a thermal deposition treatment process and system is applicable to any thermal treatment process and system.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

To facilitate an understanding of the concepts leading to the invention, reference is made to FIG. 1. FIG. 1 depicts a simplified thermal treatment of a workpiece, specifically a thermal deposition coating operation wherein a coating material at elevated temperature is applied to a workpiece. In FIG. 1, a workpiece 2 comprised of a workpiece substrate surface 3 is coated with a coating material 4 deposited from a thermal treatment means, in this case a thermal deposition head 6. Thermal deposition head 6 is reciprocated between point a and point b over the surface 3 of workpiece 2 and the coating material 4 applied on the surface 3 of workpiece 2 along the line ab. This means that the stroke time (t stroke) from a to b is much less than the time required to complete the entire coating operation. Thus, industrial practice generally requires several scans or reciprocations of the thermal head 6 to produce a coating having a preselected thickness over preselected areas of the workpiece or over the entire surface 3 of workpiece 2. A cryogenic coolant 8 is supplied from a coolant supply 10 to the surface 3 of workpiece 2 to assist in the removal of heat as the thermal deposition head moves from point a to point b. The process is reversed as the thermal deposition head moves from point b to point a. Rapid removal of heat from the workpiece 2 allows for increased production rates by keeping the overall temperature below a preselected design maximum temperature (Tmaxi) and above a minimum temperature (Tmini) for the workpiece. Instantaneous temperature readings are recorded by thermocouple 12.

Tmaxi and Tmini are "arbitrarily" set by the operator of thermal spray coating system based on component geometry and material considerations. For example, Tmini is usually set just above the boiling point of water in a thermal spray process based on combustion heating, e.g. HVOF (high-velocity, oxy-fuel) spraying with H2-flame or hydrocarbon flame. Other considerations could be used to set Tmini in the case of plasma spray coating in vacuum chamber. Tmaxi is usually set at the level preventing thermomechanical degradation of substrate material. If a heat-treated and low-temperature tempered steel component is thermally spray-coated, Tmaxi may be set at the level of 200 or 300 degrees C. to prevent unwanted workpiece material softening. Similar approach can be used in presetting Tmaxi for aged aluminum alloys, polymer composite components, and complex geometry components which tend to concentrate damaging thermal stresses. In other thermal treatment processes, a coating may be detrimentally impacted if the temperature of the coating does not remain above a certain temperature, that temperature will be the Tmini, and the Tmaxi may be set at a higher temperature above which the workpiece begins to be detrimentally impacted if the temperature of the workpiece is not decreased.

The use of the term "thermal head" represents a subset of the thermal treatment means and is defined as the part of a thermal coating device from which the material to be coated on the workpiece surface exits the thermal coating device to coat the surface of the workpiece. The thermal head includes thermal spraying guns (and includes HVOF, APS, VPS, arc-spray, flame, etc.) as well as MIG welding torches which can be used for weld overlay coating, laser powder spray coating systems, PTA powder and wire coating systems (a hybrid of plasma and welding) and the like.

Figure 2:
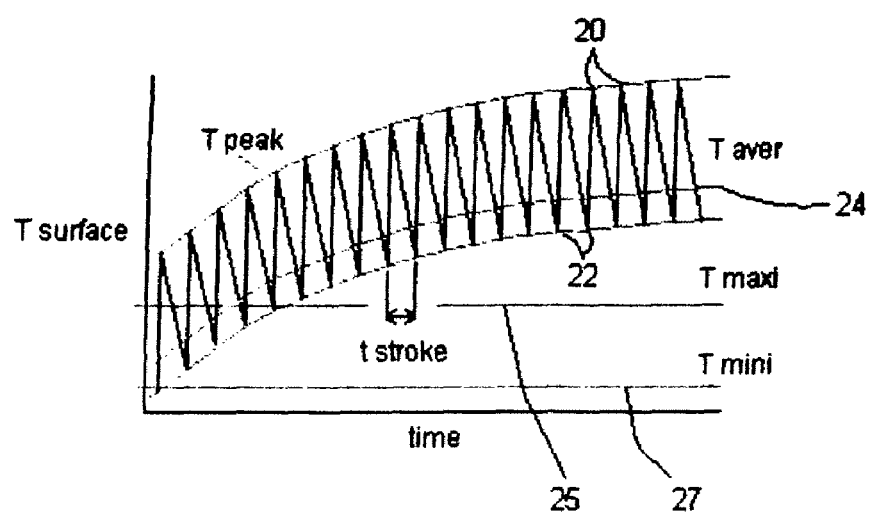
FIG. 2 is a plot of the single-point temperature measurement of the interface between the workpiece and the coating verses time illustrating a temperature cycle in the thermal deposition operation shown in FIG. 1.

FIG. 2 is a plot of the instantaneous temperature measured by thermocouple 12 versus time as the thermal deposition head 6 shown in FIG. 1 deposits coating material 4 between points a and b in absence of the coolant. In a thermal deposition coating operation, peak temperatures represented at temperature points, T peak 20, are generated with each pass over the thermocouple. As the thermal deposition head moves away from the thermocouple, the temperature of the workpiece at the thermocouple decreases as a result of the heat dissipating within workpiece 2 via conduction, by radiation and by convection resulting in a lower minimum temperature 22. The line Taver 24 is a calculated average temperature. (Its significance is described in subsequent paragraphs with respect to the invention.) The term average and mean will be used interchangeably herein, unless otherwise indicated. The design, preselected maximum temperature for the workpiece, is designated Tmaxi 25, and the design, preselected minimum temperature for the workpiece, is designated Tmini 27. The Tmaxi is the preferred maximum temperature for the workpiece in the coating system and Tmini is the preferred minimum temperature for the workpiece in the coating system. As shown in FIG. 2, the temperature of the system quickly moves above the Tmaxi, therefore the coating will not be as desired, and/or may be defective.

The deposition method illustrated in FIG. 1 uses a single source temperature measurement that cannot adequately solve the problems of heat removal from the workpiece 2 and nonuniform temperatures in various locations of the workpiece that may be above Tmaxi or below Tmini. Moreover, the use of a fixed-point temperature sensor does not address various momentary process measurement upsets, including the thermal sensor location (with respect to the thermal deposition head at the time-point of taking the temperature measurement), and overreacting temperature sensors. Overreacting temperature sensing may be caused by overshadowing and blinding of temperature sensors by spray plume, dust, cryogenic vapor or ice cloud, the traversing thermal deposition head itself and hot material plume. Overreacting temperature sensing may also be caused by localized shifts in the emissivity and thermal fields of workpiece surface, which are a function of location on the workpiece surface, and the measurement time.

The thermal input data typically generated using the single source temperature method presented in FIG. 2, above, led Applicant to the recognition that: the temperature of a workpiece during the coating operation must be represented in a more uniform way than before, in order to be able to use it for control purposes; the use of a thermally conductive substrate surface, i.e., a thermally conductive workpiece or surface of the workpiece, and/or a thermally conductive coating material, will be necessary to even-out local thermal gradients generated on the surface of the workpiece during thermal coating; and, substantially simultaneous reading of surface temperatures in multiple areas and averaging them would be helpful to control the thermal treatment process. Additionally, in some embodiments, use of multiple temperature measuring devices would be desirable to provide more reliable temperature measurements and average temperature determinations. The integrity and adhesion of thermal coatings, which are affected by local and temporal temperature gradients generated on the surface of the workpiece during thermal coating, depends primarily on limiting large-scale expansion or contraction of the entire workpiece and/or the coating because of a mismatch between the thermal expansion coefficients of the workpiece and the coating material. Minimizing large scale expansion and contraction requires maintaining the average temperature of the workpiece between Tmini and Tmaxi.

The present invention provides for the use of a thermally conductive substrate, or coating material or both. In some embodiments the substrate (surface of the workpiece) and/or the coating if one is applied in the process will have a conductivity of at least 5 W/mK. The substrate may be metallic, as the workpiece to be coated and in some embodiments the total coating thickness which may be put down in multiple passes over the surface of the workpiece substrate, will be less than half the thickness of the substrate at its thinnest cross section. Stated another way, the thermally conductive substrate may be at least two times thicker in its thinnest cross-section than the thickness of the resultant deposited coating. An aspect of the present invention is that of substantially simultaneously using multiple temperature inputs for process control which may come from one or two or more (a plurality of) contact and/or non-contact temperature measuring devices and, while using them, averaging their momentary readings of the surface temperature of the workpiece over a predetermined time-span and over a predetermined surface area. In one embodiment shown herein a plurality of noncontact temperature measuring devices are used to measure the temperature of the surface of the workpiece; however, a mixture of one or more contact and one or more noncontact temperature measuring devices would also be useful in this invention. Additionally temperature measuring devices that measure average temperatures within areas, or locations that may be within one or two or more zones may be useful in this invention, alone or in combination with temperature sensors that measure in areas, points or locations, that may be within a single zone. Further, a mix of different types of non-contact temperature measuring devices in a single system may be useful.

In the development of a control process for the thermal treatment method, for example the thermal deposition of coating materials onto a thermally conductive substrate, Applicants determined that if one measured the surface temperatures substantially simultaneously over a significant area of the workpiece, averaged the temperatures and plotted the average of the temperature readings (Taver), the average temperature of the surface of the workpiece would climb up fast but uniformly during the deposition process as shown by line 24 in FIG. 2. In this invention Tavg can be controlled so that the average temperature of the workpiece will stay between a preselected maximum temperature, Tmaxi 25 and a preselected minimum temperature Tmini. From this it was concluded that a simple but effective measurement of the workpiece temperature in multiple locations, and calculation of an average temperature of the workpiece, Tavg, could be utilized for the control of at least one of the following: the flow rate of coolant onto the workpiece, the thermal treatment rate which can be a heating treatment rate or a cooling treatment rate depending upon the process, the relative speed between the thermal treatment means and the surface, the relative speed between the heating means or the cooling means and the surface, and/or a heating flow rate onto the surface. Every system and process of this invention may not provide the option to control each of those just-listed controllable conditions. For example, in some embodiments, the thermal treatment rate will not be adjustable, and/or the coolant flow rate will not be adjustable, and/or the relative speeds will not be adjustable.

The heating flow rate would be provided by a heating means with a heating means controller (that might be in addition to a heating treatment means) in an embodiment in which extra heat needs to be added to the process to maintain the temperature above a specified minimum temperature. In the thermal deposition processes shown in the figures herein, a separate controllable heating means is not provided. In the thermal deposition processes shown in the figures, the calculation of the average temperature of the workpiece can be utilized to control the coolant rate, the coating deposition rate onto the surface of the workpiece, and/or the relative speed between the surface and the deposition head. The deposition rate is the amount of material ejected from the deposition head per unit time in the thermal deposition process.

In embodiments in which one or more heating means are desired, it or they can be provided by a forced air heater, burners, flames, lasers, torches, hot plates, electric heaters, or the like. The heating means should be controllable by the process by adding one or more heating means controllers for controlling the heating means. The controller or controllers would adjust the one or more heating means to increase the heat added to the surface of the workpiece or to particular zones of the surface of the workpiece. Controllers may also be provided to control the movement of the heating means relative to the movement of the surface of the workpiece. A heating means should be added to a thermal treatment process or system of this invention when the average temperature should be maintained above a minimum temperature and no heat or not enough heat is added by the thermal treatment process or system. Examples of systems and processes in which one or more heating means would be added to the system or process include welding applications in which a more uniform temperature is desired.

Any coolant having a lower temperature than the substrate may be useful as a cooling treatment means or as a coolant in this invention. The cooling treatment means or the coolant may be a liquid, gas, or solid, or a mixture of two or more phases or coolants in different phases. Examples of coolant treatment means (or cooling means) and coolants that are useful in this invention include forced air, water, inert gases, cryogenic coolants, or any other coolant known to be useful in thermal treatment processes. Cryogenic coolants (coolants having a temperature below −70° C. or below −100° C.) may be used in a thermal treatment process of this invention as the cooling treatment means or as a cooling means. In a thermal deposition process the cryogenic coolants can be used as the coolant by jetting (coolant means) at least a portion of the coolant on the coated, partly coated, and/or yet to be coated workpiece surface. Cryogenic coolants include inert coolants, e.g., noble gases, which may be gaseous, liquefied or partly liquefied, such as argon or helium for all types of coating materials, nitrogen for the majority of metallic, carbide, nitride, and boride coatings, and, optionally carbon dioxide, or air for non-oxidizing, usually oxide-containing coatings such as alumina, zirconia, titania, hydroxyapatite, perovskites, etc. The infrequent situation when a noble gas coolant rather than nitrogen, even if cryogenic, must be used with metals involves spraying of titanium, tantalum, magnesium and similar, reactive metal coatings which form nitrides quickly. Specific thermally deposited coating materials suited for the practice of the invention are selected from the group of metals, alloys, intermetallic compounds, oxide-, carbide-, boride-, and nitride-ceramics, composites, and any of their combinations.

Cooling means for applying or directing the above-listed coolants onto the surface of the workpiece include fans, compressors, pumps, jets, nozzles, distributors or the like. Cooling means may be provided with one or more controllers for controlling the flow rate of the coolant from the cooling means. Individual controllers for one or more of the cooling means may be provided for separately controlling the flow rate from the cooling means to the surface or to specific areas or zones of the surface of the workpiece. Controllers may also provide for the motion of the cooling means relative to the surface of the workpiece.

An improvement upon the basic concepts leading to temperature averaging (determining the mean) and optionally adjusting the coolant flow rate (or coating deposition rate onto the workpiece surface, or relative speed between the workpiece surface and said thermal treatment means, for example, deposition head) where Taver (mean of the multi-area temperature readings) remains above a preselected low temperature, Tmini, and below a preselected high temperature, Tmaxi, for minimizing thermally induced, local stresses between the coating and workpiece substrate surface and protecting the workpiece from localized thermal damage, resides in creating uniformity of temperature within the substrate and coating surfaces. A persisting non-uniformity of the temperature within the workpiece surface can be caused by variables such as workpiece geometry, non-optimum coolant application, and other, unoptimized parameters of the thermal deposition process. Therefore, in another embodiment of the process of the invention, the standard deviation from the mean of cumulative multi-area temperature readings will be determined and will allow for improved control because the mean of the multi-area temperature readings alone is unable to detect longer-term trends in the temperature evolution during coating process and/or excessive temperature fluctuations within the workpiece surface and the coating. Determining the standard deviation is also applicable to other thermal treatment processes for similar reasons.

Figure 5:
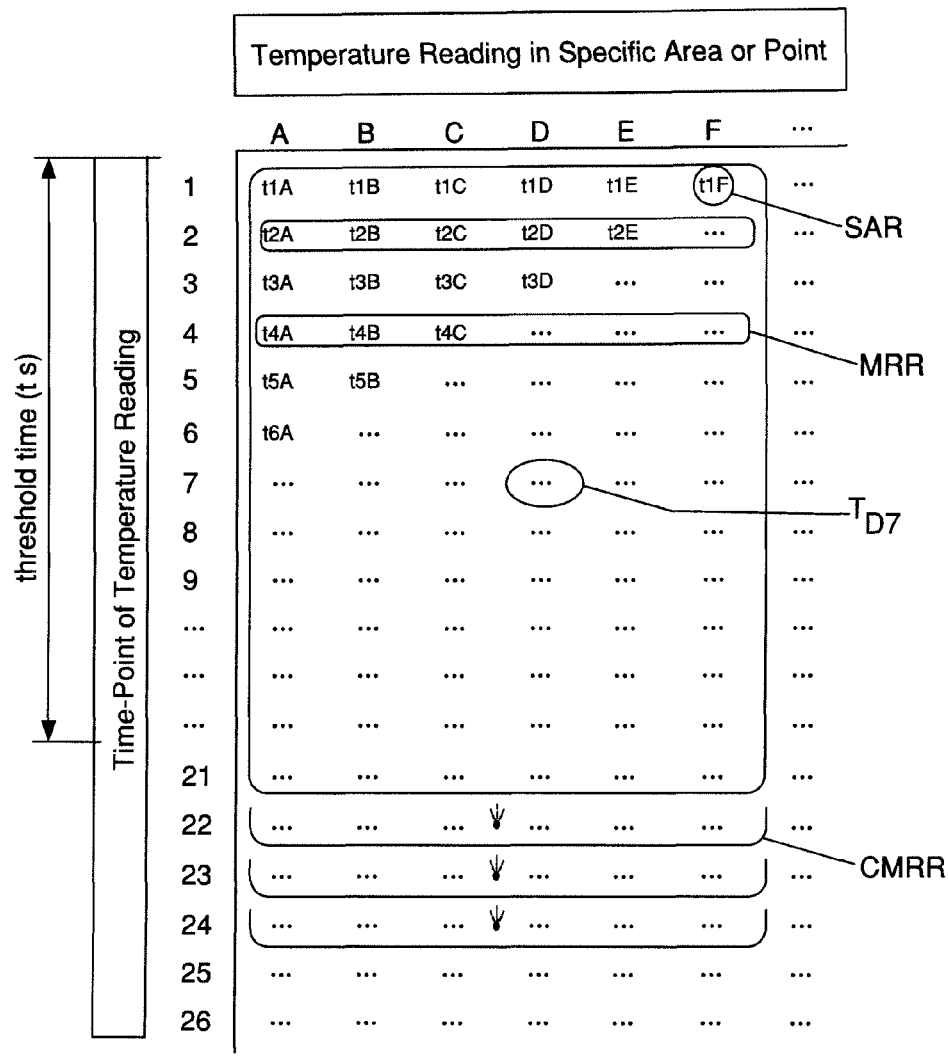
FIG. 5 is one embodiment of a temperature input recording matrix useful in the process of this invention.

The mechanics in the improved process control methods of this invention, illustrated in FIG. 3-6, involve, as a first step, the taking of multi-sensor single temperature area readings (SAR), substantially across the length, width, diameter, or other dimensions of the surface of the workpiece 2, including the edge and midpoint areas. (The use of the terms length and width to describe dimensions of the workpiece are not limiting, because it is understood that the process of this invention can be used for workpieces having any shape and that other dimensional terms my be substituted for the terms lengths and widths.) For example, the location of the edge temperature measurements are identified as points c-i and k in FIG. 3 or across the length of the cylinder at points A-F in FIG. 4. These temperature measurements are measured substantially simultaneously at each time-step, collected forming a multi area reading (MRR), and then averaged. The time-step is the interval of time between the substantially simultaneous measurement of the temperatures across the surface of the workpiece to be coated. The time-step will depend on the total time needed to thermally treat a workpiece using the process of this invention, and the thermal conductivity of the workpiece and/or the coating, and other characteristics of the thermal treatment process and may be established experimentally, but may be for example 0.1 to 5 seconds or 0.5 to 1.0 seconds. The average, and more precisely, the mean of the multi area temperature readings taken at one time-step, designated mean (MRR), as stated heretofore, is used to control one or more of the following: the coolant flow rate, the thermal treatment rate, for example, the coating deposition rate onto the surface of the workpiece, and/or the relative speed between the surface and the thermal treatment means, for example, the deposition head, to maintain Taver between Tmaxi and Tmini. In a second step of the improved process control method, the standard deviation is used as a mechanism for temperature control. In this step, a certain threshold time (ts) is established after which the single area reading values measured at a (each) time-step start to be used for calculation not just of each MRR (along individual rows in FIG. 5) but also of a cumulative multi-area reading matrix, designated CMRR (within two-dimensions as shown in FIG. 5). The entire cumulative multi-area reading matrix population with all cumulative multi-area reading matrix values CMRR is continuously updated (vertically expanding) and used for standard deviation calculation with every new time-step past the threshold time. With this two-dimensional data matrix, the standard deviation of all temperature readings measured over a coating deposition cycle, designated S(CMRR) can be calculated. Once the standard deviation S(CMRR) has been calculated, it can be used to compare to previously determined and established control standard deviations. For example, there could be two established control standard deviations designated S1 and S2, where S2 is larger than S1; however in other embodiments there could be 1 or any number of control standard deviations. For the example in which two control standard deviations are used, the calculated standard deviation is compared to S1 and S2 and if the value of S(CMRR) is larger than the preselected values, at least one of the following actions can be executed: [1] the relative motion (speed) between the thermal treatment means, for example, the thermal deposition head and the surface of the workpiece may be accelerated, and/or the thermal treatment rate, for example the coating deposition rate onto said surface may be decreased, and/or the coolant flow rate onto said workpiece may be increased and/or the heating flow rate onto said workpiece may be decreased and/or the relative speed between the heating means or the cooling means and the surface may be increased or [2] the thermal treatment means, for example, the deposition of coating material may be temporarily suspended or limited. In one embodiment the option [1] can be used if S(CMRR) is larger than S1 but smaller than S2, and option [2] can be used if S(CMRR) exceeds both S1 and S2. For some processes the operation of some thermal treatment means may be "limited", meaning close to being fully shut off and/or having limited impact or limited effect on the surface, when shutting off or restarting the operation of the thermal treatment means would be overly complicated or lead to long delays (for heating up or cooling down).

Low standard deviation values of the cumulative multi-area readings S(CMRR), i.e., below S1, are desired because this indicates a time lapse-confirmed, thermal uniformity of the substrate (good heat spreading), assuring an acceptable coating quality and minimum risk of a locally overheated (or overcooled) and stressed workpiece and/or coating surface. Nonetheless, the actual standard deviation values of the cumulative multi-area readings and their significance for process control depends on many variables as well as the selection of the threshold time value. So, if for example, a coating process requires 5 complete passes of a thermal deposition head over the workpiece surface, it may be desirable to set the threshold time (ts) in such a way that the standard deviation values of the cumulative multi-area readings are calculated and used for process control, only after at least 50%, or at least 70%, or at least 90% of the portion of the workpiece surface has been coated with the $1^{st}$-pass layer. Alternatively, the cumulative multi-area reading matrix, CMRR, and standard deviation, S(CMRR), may be used to control the thermal treatment process, for example, the thermal deposition process only after the first pass of the thermal deposition head over the workpiece, meaning that the threshold time is set to the time it takes to put down the first full layer, or complete the first pass of the thermal deposition head over the work piece.

Figure 9:
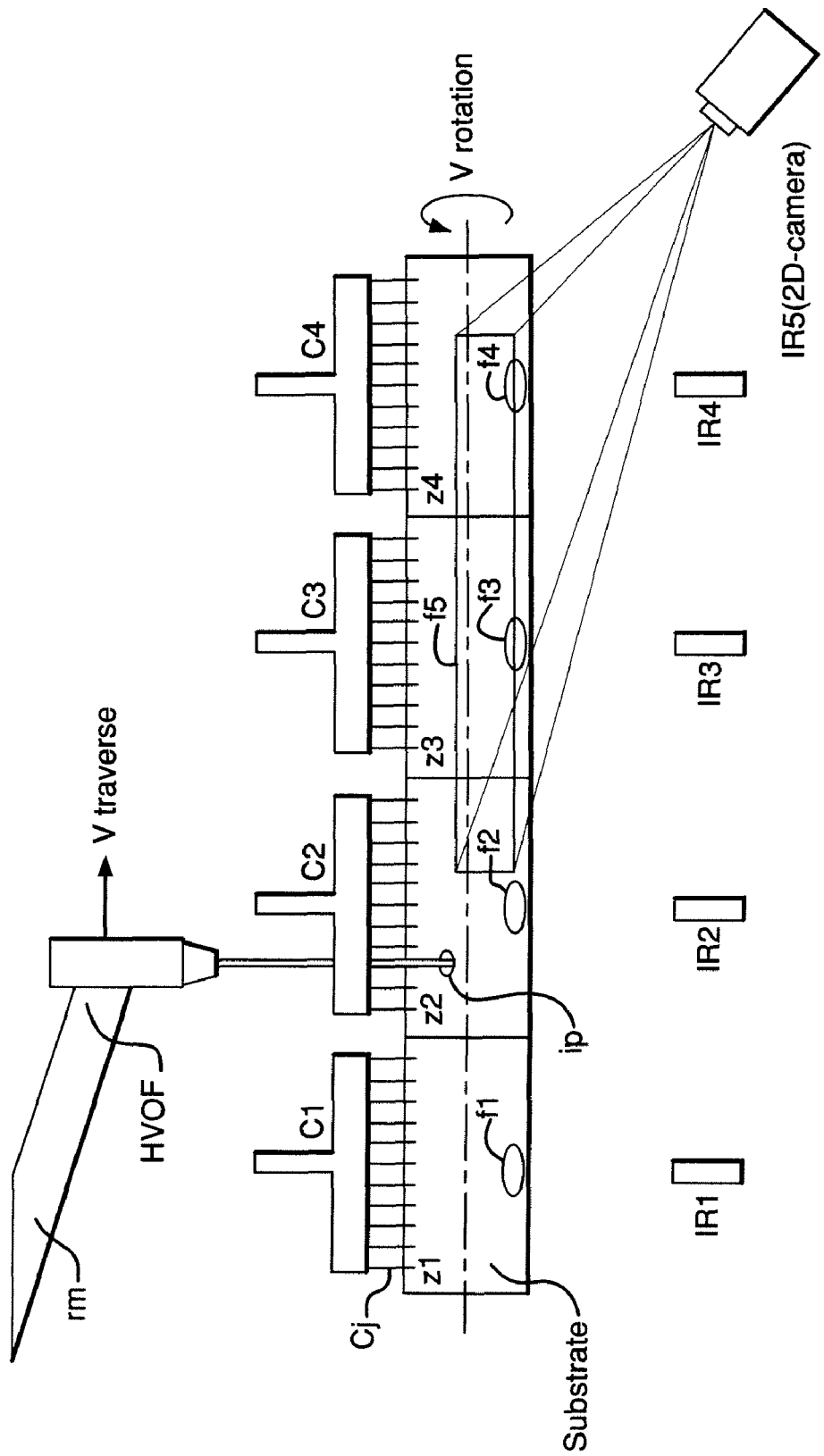
FIG. 9 is a thermal zoning method which can be used in the process of this invention involving elongated substrate parts.

Additionally, the temperatures on the surface area of the workpiece should be measured at a minimum in the areas, or substantially uniformly, over the surface of the workpiece that are presently being treated or will be treated during the present process. For example, the surface area of a workpiece in a thermal coating process over which representative temperature measurements should be taken should include the entire surface area of the workpiece that will be thermally coated by the deposition head. The temperature measurements are taken at locations or within areas or at points on the surface of the workpiece. The terms locations and areas will be used interchangeably and mean larger and smaller areas and points, which are focused areas. A temperature measurement, if taken over a large area, typically is an average temperature over that area measured by the temperature sensor (as measured by IR5 as shown in FIG. 9). Alternatively, a temperature sensor may measure multiple individual temperatures at multiple smaller locations over the surface area of a workpiece (as shown in FIG. 4).

Summarizing from the above, the instantaneous mean value, or a mean value of the multi-area readings at one sampling time, mean (MRR) used to control the flow of cooling medium or other controllable conditions, may be calculated as shown in the first equation below.

$$Mean(MRR) = \frac{1}{M}\sum_{i=A}^{i=m} Tij$$

where:
Mean (MRR)=mean value of multi-area readings at one time
Tij=single temperature reading at one time and one area
i=A, B, C . . . M (number of temperature control areas)
j=1, 2, 3 . . . n (number of measurement time steps)

The mean (MRR) provides an instant, area-averaged thermal measurement of the surface of the workpiece to be coated. This result provides for a good estimate of large-scale, temperature changes at various points on the surface of the workpiece. In one embodiment, heat control for the workpiece is provided by controlling coolant flow to the workpiece surface to maintain the average (mean) of the multiple area temperatures between a preselected Tmaxi and Tmini.

In another embodiment, once past the threshold time, a mechanism for determining the standard deviation from the cumulative mean CMRR is represented by the equation:

$$S(CMRR) = \sqrt{\frac{1}{Mn}\sum_{\substack{i=A\\j=1}}^{\substack{i=M\\j=n}} Tij^2 - \left(\frac{1}{Mn}\sum_{\substack{i=A\\j=1}}^{\substack{i=M\\j=n}} Tij\right)^2}$$

where:
S(CMRR)=standard deviation of cumulative multi-area readings accumulation from start to actual measurement time
Tij=single temperature reading at one time and one area
i=A, B, C . . . M (number of temperature control areas)
j=1, 2, 3 . . . n (number of measurement time steps)

As noted above, the S(CMRR) may be compared to S1 and S2. Exceeding S1 indicates, for the thermal deposition example, that the thermal uniformity of the workpiece surface is becoming marginal, and the heat spreading over that surface must be improved or the quality of the coating deposited may be poor. In one embodiment, a more uniform heat spreading may be achieved by accelerating the relative speed between thermal deposition head and the surface, i.e., by accelerating the motion of thermal deposition head and/or workpiece, with a corresponding acceleration of the coolant means or distributor, unless the coolant means or distributor is stationary. The accelerated relative motion of the deposition head and the workpiece results in a thinner coating layer deposited per thermal deposition head pass, therefore, each acceleration is associated with a corresponding increase in the number of passes to deposit the coating of the target thickness. Alternatively or additionally, to achieve more uniform heat spreading, the coating deposition rate onto said surface can be decreased by decreasing the deposition rate of material from the deposition head, and/or the coolant application rate onto said workpiece can be increased in response to a S(CMRR) greater than S1. The process could increase the speed of the workpiece or the speed of the deposition head or both to increase the relative motion of the workpiece and the deposition head. In alternative embodiments in which a heating means is provided, the heating means may be activated, moved faster or slower, and/or the heating flow rate may be increased or decreased.

Reaching and exceeding the standard deviation limit S2, which has a larger value than S1, indicates that the thermal uniformity of the workpiece surface has become progressively unacceptable, and the operation of the thermal treatment means, for example, the thermal deposition head must be temporarily suspended or limited during the thermal treating process cycle before resuming in order to give the workpiece more time to achieve a more uniform temperature. In a thermal deposition process that time is needed to spread the heat that was already deposited with coating material. Frequent or extended shutdowns of a thermal treatment means, for example a thermal deposition head during coating operation, resulting from reaching or exceeding the predetermined S2 value, indicate that changes in the set-up of the coolant distributor(s), the thermal treatment means flow rate or, perhaps, in the configuration of the entire system are required to prevent production rate losses. Additional standard deviation limits providing for alternative process control steps can be provided if desired as would be apparent based on what has already been described herein.

Figure 6:
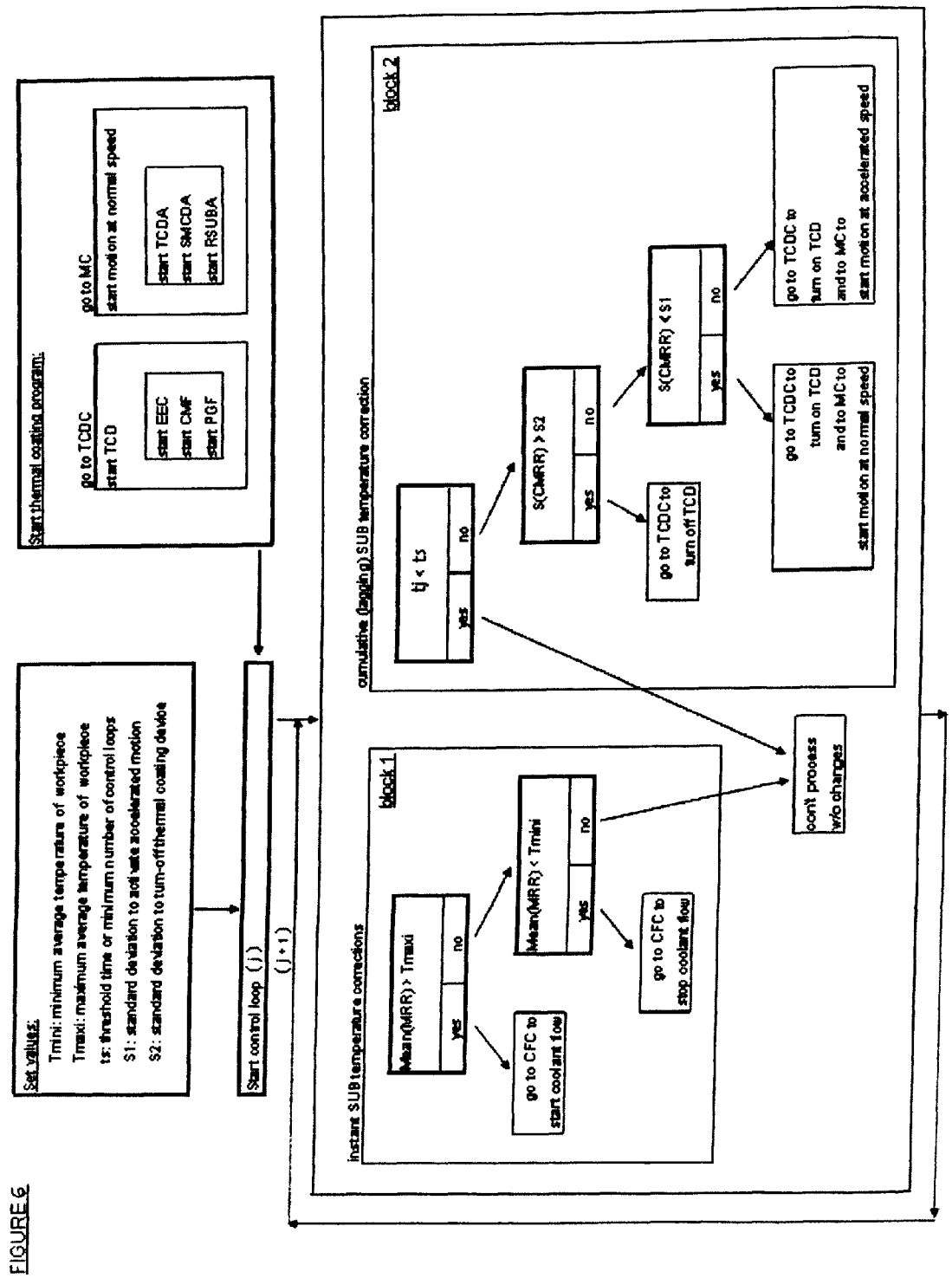
FIG. 6 is a flow diagram of one embodiment of the cooling control process of this invention showing two logic blocks for both heat control and uniform temperature control.

FIG. 6 illustrates and describes one method for controlling the average temperature and thermal uniformity of the workpiece in a thermal deposition coating process embodiment in accordance with this invention. In this process the operation of the cryogenic cooling system, and the relative motion of the deposition head and the workpiece are controlled on the basis of two logical function blocks:

[1] instantaneous workpiece surface temperature corrections; and,

[2] cumulative or time-lagging temperature corrections.

Block 1 describes the control of the flow of coolant based on an actual value of the mean of the multi-area temperature readings, mean (MRR), while block 2 describes the control of the relative speed of thermal deposition head and workpiece, and the turning-off or turning-away of the coating material discharge from the thermal deposition head, when required, based on the updated value of the standard deviation of the cumulation of the multi area temperature readings S(CMRR). (A turning away of the coating material discharge means turning it away from the surface of the workpiece. The coating material continues to exit the discharge head and is typically collected in a container.) Additionally, block 1 is used for coolant flow and temperature control in the test runs required to determine the limiting values of S1 and S2. Note that the values of Tmini and Tmaxi are determined by the coating process operator in advance of the coating and cooling process based on "external" material and process considerations and inputted into the control program in a step preceding block 1.

The following is the operating procedure during test runs (a) the personal computer/data acquisition (PC/DAC) system receives the Tmini, Tmaxi, and threshold time (ts) set points.

(b) the thermal deposition head (TCD) is prepared for operation which involves a routine loading of the motion and the thermal deposition head programs to the respective controllers (for example, TCDC, MC and CFC, see FIG. 4), outside of the temperature control system;

(c) with the start of the coating process, in the first time-step (tj=1), a multi-area optical sensor MTOS, for example, reads individual single area reading values (SAR) from each control area or control point, while PC/DAC saves them in the first row of the time-temperature matrix as shown in FIG. 5 in the form of multi area temperature readings (MRR) and calculates their mean, mean (MRR). Note that each SAR has a temperature unit, e.g. degrees Celsius, and is defined within the matrix of temperature readings by two subscripts locating its column and row, for example, $T_{D7}$ is the temperature reading in the surface area D shown in FIG. 4, measured at the time-step 7 as illustrated in FIG. 5;

(d) in the first logical box, in block 1, shown in FIG. 6, the mean of the multi area temperature readings is compared to Tmaxi. If the mean is larger than Tmaxi, then the coolant flow starts (or may be increased when this step is repeated in the process) and the process repeats step (c) for the next time-step (tj=2); unless the mean is smaller than Tmaxi then the process continues to step (e);

(e) the second logical box in block 1 compares this mean value to Tmini. If the mean value is less than Tmini, then coolant flow is stopped, or the coolant valve stays in the closed position (if it were not opened before), and the process repeats step (c) for the next time-step (tj=2) (the workpiece is too cold, as it may happen at the start of the coating process, no setting is changed in the anticipation of workpiece increasing the temperature in the next time-steps); however, if the workpiece does not heat up within an expected amount of time, the process may shut down and/or indicate an error message to an operator;

(f) if the mean value is more than Tmini, then there is no change in the coolant flow status, i.e. the coolant continues to flow if it was opened before or continues to be stopped if it was stopped before; the process repeats step (c), in the following time-step (tj=2);

(g) the steps (c)-(f) are repeated with each new time-step (tj=2, 3, 4, 5 . . . ) or loop until the end of the entire coating process cycle as determined by the thermal deposition head controller (TCDC) and motion controller (MC) which are 'external' to the temperature control system. The values of S(CMRR) are calculated and saved by the PC/DAC system starting from the threshold time (ts) for the post test-run examination to determine S1 and S2; and, (h) then, after a few more test runs, if necessary, the operator examines coating quality, correlates it with the saved values of S(CMRR) and selects a value of S1 and S2 for the subsequent production runs.

The process for coating workpieces, after completing the test runs, starts with adding S1 and S2 to the set values (e.g. ts, Tmini and Tmaxi). In contrast to the test runs, block 1 and block 2 are now operating in parallel. The function of block 1 is the same as described above for the test run. Block 2 starts with a logical box checking if the actual time-step, tj, is less or more than the threshold time (ts). If tj is less than ts, the entire block 2 is skipped during the pending time-step, but tj and ts will be compared again in the next loop. Meantime, block 1 works just as in the test run. However, if tj is more than ts, the next logical box of block 2 checks if the actual S(CMRR) value exceeds the value of S2. If S(CMRR) is greater than S2 the thermal deposition head is turned off or in alternative embodiments is turned away from the workpiece, which results in suspending or limiting the deposition of the coating until the heat already delivered to the workpiece surface spreads out and makes the surface temperature more uniform. Note that turning-off or turning away the thermal deposition head doesn't disable the operation of block 1 which continues its own, independent control of mean (MRR), by turning coolant flow on or off, if required. If the S(CMRR) value is less then S2, the next logical box in block 2 compares the S(CMRR) to S1. If the S(CMRR) is less than S1, the program optionally makes sure that the thermal deposition head is on, in scan mode, and that the motions are executed at the normal speed, after which, the loop is restarted in the next time-step. If the mean is more than S1, the program signals the MC to accelerate the relative motion between the thermal deposition head and workpiece, optionally after making sure that the thermal deposition head is on. After this, the loop is restarted in the next time-step.

The advantages of the thermal control process of the embodiment of the present invention detailed in FIGS. 3, 4, 5 and 6 is the simplicity and flexibility of the process due to independent control of the workpiece cooling by block 1 and the heat spreading over the workpiece surface by block 2. The process algorithm avoids the programming and automation complexities of associating specific points on the thermal image of the workpiece surface with the actual position of the thermal deposition head, and/or adaptive manipulation of motion and coolant controllers according to the thermal gradients identified on complete, real-time thermographic images. Moreover, the calculation of S(CMRR), offers process operators an insight in and a chance for improving initial process parameters and cooling system configuration, so that with time and following a few test runs, corrections can be made and a fully stabilized coating production process may operate at a minimum value of S(CMRR), without triggering motion speed changes, and controlling only the coolant flow within block 1.

The process and system of the invention can be used for real time control of a thermal treatment process in which temperature measuring devices and a computer are used to determine mean (MRR) and S(CMRR) which are used in a continuous feedback loop to control the thermal treatment of a workpiece.

The following examples are provided to illustrate various embodiments of the invention and are not intended to restrict the scope thereof.

Example 1

The purpose of this example is to more fully explain the control parameters enumerated in the description of the process steps shown in FIG. 6. FIGS. 4, 5 and 6 are used to facilitate the description.

FIG. 4 illustrates a thermal deposition process employing a workpiece 40 comprised of a workpiece substrate surface 41 which has cylindrical shape and which is rotated during the thermal deposition coating process. The workpiece (RW) comprised of workpiece substrate surface 41 is mounted in a remotely actuated, rotating holder (RWA) 42, and exposed to hot coating deposition material 46 from the thermal deposition head (TCD) 44 which, in turn, traverses over the workpiece surface by the means of a separate actuated holder (TCDA). Traversing in sync with thermal deposition head 44 is an elongated, cryogenic coolant distributor (SCMD) 48 which provides the cooling effect either to the coated only portion of the substrate 41 or to the uncoated and coated portions of the workpiece surface. A CNC or robotic-type motion controller (MC) 50 coordinates the movements of the rotation of the workpiece 40, the motion of the thermal deposition head 44 and, optionally, coolant distributor 48.

Due to the rotation of workpiece 40, a non-contact, optical, multipoint system (MTOS) is used for temperature sensing. The multipoint optical sensor 52 can be an array of separate, single-point sensors or the multi-point sensor can be a thermographic (thermoimaging or thermovision) camera capable of mapping out thermal fields on examined surface and digitizing temperature outputs in selected areas within its view. Examples of suitable single-point sensors that can be arrayed for a multi-area temperature measurement include single or two-wavelength (two-color) infrared transmitters available from Micron Infrared, Raytek, Omega, and other vendors. As convenient in a given application, some of these sensors can be equipped with a laser-aiming device or they can transmit acquired optical signals via flexible optical fiber. The most demanding applications operating within a relatively high temperature range can use an array of self-correcting Quantum IR-thermometers from Micron which illuminate the target surface with a beam of laser in order to correct the initially assumed emissivity coefficient.

Presented symbolically in FIG. 4 temperature control points A through F can be distributed by the coating process operator over the surface of the workpiece 40 in any way found convenient in a given situation as long as that distribution is more or less uniform and, at least, some of the areas are located in the areas of the workpiece which are expected to be the most sensitive to temperature variations. The size of temperature control points or areas, e.g., A, B, . . . F shown in FIG. 5, is not critical and may vary depending on the type of thermal sensor used, but their number should be sufficient to reflect transient temperature distributions over the surface of the workpiece, and the temperature distribution over the coated and uncoated workpiece surface. Thus, at least four control points should be used for the coating of small workpieces, which are a few inches long or wide, while at least six and, preferably, more control points should be used for coating of larger workpieces.

To further illustrate the control of heat and temperature uniformity, assume a cryogenically cooled thermal deposition process, where a single pass of the thermal coating deposition head 44, (TCD), over the workpiece results in a 0.002-inch (51 µm) thick coating, but the target coating thickness is 0.010-inches (254 µm). Five passes are needed to reach the target at the normal traverse speed of the TCD used. Assume that the temperature sampling time-step is 0.5 seconds, and the TCD can traverse either at normal speed or at a doubled speed. The properties of the substrate and coating material, and prior tests involving coating of the workpiece in test runs using the specific TCD system have indicated that the following limiting values need to be used during production runs: Tmini=80° C., Tmaxi=140° C., S1=10° C., S2=40° C., and threshold time ts=20 iteration time-steps=10 seconds as required to complete the first pass. If the initial process parameters, including the location of cryogen distributors (SMCD) are right, the following are observations that may be made during the production run:

Taver or mean (MRR) starts from the initial temperature somewhat above room temperature and, then, slowly fluctuates during the coating operation between 80° C. and 140° C. and it is kept in this range by the cryogenic coolant flow control valve (CFC).

Mean value of the cumulative, multi-area readings accumulated during the coating operation, Mean (CMRR), a discrete process value which is used by the PC/DAC to calculate the standard deviation S(CMRR), fluctuates by much less than the instantaneous Taver, perhaps, within the range of 100° C. to 110° C.

S(CMRR) or standard deviation is calculated and updated every time-step from the iteration time-step #21 on for the population of all multi-area readings accumulated during coating operation (CMRR) and the value is less than 8° C. and fluctuates by about 1° C.

If the initial process parameters, including the location of distributors for the cryogenic coolant are not optimal, the observed values of Taver and Mean (CMRR) can still stay the same as before, but the standard deviation, S(CMRR), may run away during the coating operation to reach a value of, say, 20° C. after the iteration time-step #80. Since this value is more than the S1 limit, the processor would double the relative speed of the TCD with respect to the workpiece surface and double the number of remaining iteration time-steps from 20 more to 40 more, as well as the number of remaining TCD coating passes from one more to two more.

The increase in the relative traverse speed of the TCD and workpiece 40 should bring down the actual value of S(CMRR) to below S1. If the opposite happens, the controller will turn off TCD while continuing the control of Taver via cryogenic coolant flow. Thus, if after the iteration time-step #90, the actual value of S(CMRR) shoots up to 50° C., i.e., more than the S2 limit, the thermal coating device controller, TCDC, will shut down the thermal deposition head (TCD) which may be accomplished by stopping the flow of the coating material from the deposition head or turning the TCD away from the surface to be coated and monitor the changes of S(CMRR) in the subsequent iteration time-steps. As soon as the actual S(CMRR) drops to below S2 (S2=40° C.), the coating action is restored at the double traverse speed according to the situation described above, with the number of missed iteration time-steps doubled and added to the number of remaining steps that are corrected for the doubled traverse speed as well.

Example 2

Figure 3:
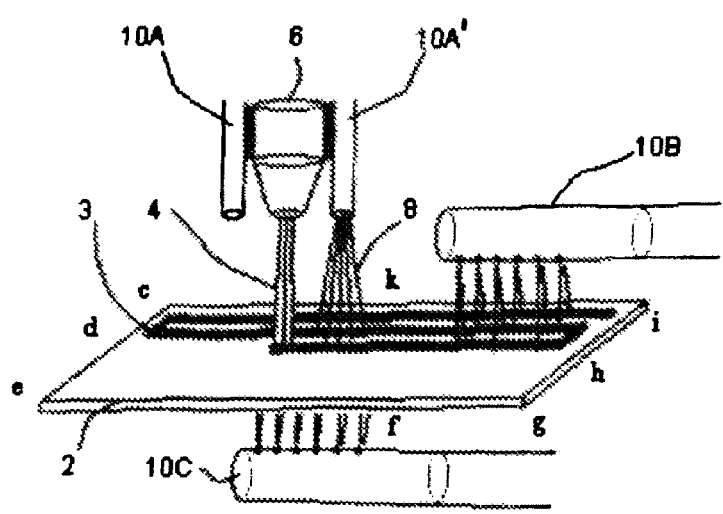
FIG. 3 is one embodiment of a system which can be used in the process of this invention showing various configurations and placement of cryogenic coolant distributors in a thermal deposition process.

FIG. 3 is a view of a thermal deposition process employing, optionally, both traversing and stationary cryogenic coolant delivery systems for the workpiece. Common pieces of equipment to those shown in FIG. 1 are similarly numbered. In showing a method for establishing cooling in the thermal deposition coating operations using a cryogenic gas coolant media, one or more coolant means 10A, 10A', 10B and 10C provide a coolant 8. These coolant means, such as 10A, 10A' may move with thermal deposition head 4, move as the distributor 48 shown in FIG. 4 moves, or remain stationary. Cooling the top side of the workpiece, that is the surface of the workpiece to be coated, where the heat is deposited with coating material is more desired than cooling the back side of the workpiece because of the resultant stress distribution. Of course, cooling the top side of the workpiece surface, whether the cooled portion of the surface was already coated or not, is more difficult. In one embodiment, coolant means, nozzle 10A is used to spray coolant on the surface of the workpiece when the deposition nozzle moves from points c, d, and e towards points i, h and g, respectively and nozzle 10A' is used in the reverse directions. In these embodiments the coolant trails the deposition of material onto the surface.

In alternative embodiments, although not shown, a forced air coolant stream can be added to the system by adding a compressor or fan that blows air onto the surface of the workpiece. Air cooling could be provided instead of or in addition to cryogenic cooling. The compressor or fan could have a set flow rate or be controllable by the process by adding a forced air controller for controlling the compressor or fan. The controller would adjust the speed of the compressor or fan to increase the air flow rate (coolant) when extra cooling was needed by the thermal treatment process, and decrease the air flow rate when less coolant is needed. As discussed above, alternative coolants can be similarly added if desired.

Example 3

Industrial tests of the present system and method were carried out during HVOF spray coating operation involving WC-Co coating material. The HVOF gun was spraying 45 grams of WC-Co powder per minute at an elongated, rotating airplane landing gear component made of high-strength steel. The surface speed of the rotating component was 150 ft/minute, the gun traverse speed along was ⅛-inch per each revolution, the distance between the gun nozzle and the component surface was about 9 inches. The HVOF flame was hydrogen-oxygen, with the hydrogen flowrate of 1525 standard cubic feet per hour at 150 psig supply pressure, and the oxygen flowrate of 475 standard cubic feet per hour at 165 psig supply pressure. Four cryogenic fluid nozzles were more or less uniformly positioned along the axis of the rotating component at the distance of about 4 inches from its surface. The nozzles were discharging a 2-phase mixture of cryogenic nitrogen vapor and fog-size droplet spray toward the surface for cooling. The cryogenic fluid supply pressure was about 120 psig and its peak (maximum) flowrate, when demanded by an instant cooling requirement, was reaching the level of approximately 22 lbs/minute. Four infrared (IR) sensors were used to monitor temperature evolution of the component surface during this HVOF coating operation and control the valves discharging cryogenic cooling medium. For convenience, all four sensors were positioned on the same side of the component as the HVOF spraying gun and the cryogenic spraying nozzles, even though sensor positioning could have been different. The consequence of such a sensor location was that they were able to "see" both the traversing HVOF gun, and the coolant dosing cryogenic nozzles, in addition to the surface of the component being coated. Thus, the temperature control system is forced to work with a much higher level of "signal noise" than in a preferred setting. Three of the four IR sensors were single-point Raytek-TX models, named here T1_1D-IR, T2_1D-IR and T3_1D-IR. The forth one, T5_2D-IR was a 2-dimensional, thermal imaging camera from Flir, A20 model, which was set to acquire an average temperature reading from a rectangular image area positioned over the central portion of the component surface. All four sensors were sending temperature readings to the computerized, controlling unit PC/DAC as shown in FIG. 4 at the frequency of 2 Hz, which corresponds to the frequency of executing control loops j shown in FIG. 6. A threshold time ts shown in FIG. 5 was set for 200, which means that the amount of information retained in the CMRR table of thermal readings was always covering the actual moment and the previous 100 seconds at the assumed 2 Hz frequency. Thus, the standard deviation S(CMRR) was calculated twice a second from temperature data table, as shown in FIG. 5, with 4 columns, one for each sensor, and 200 rows. The following, modified nomenclature and values were used for plotting the temperature during the HVOF-spraying and cryo-cooling run. [1] The value of Mean (MRR) was named "T instant average" for simplicity and calculated in degrees F. for four IR sensors used using the same procedure as before. This value was compared to operator's selected Tmini and Tmaxi values 2-times per second, and was used to control the opening or closing of the coolant flow valves.

$$T \text{ Instant Average} = \frac{1}{4} \sum_{i=1}^{i=4} T_i = [F]$$

The second temperature value calculated 2-times per second from the 4×200 sized CMRR table was "T time average", or an average temperature over the component surface during the most recent 100 seconds of HVOF-spraying and cryo-cooling.

$$T \text{ Time Average} = \frac{1}{4 \times 200} \sum_{\substack{i=1 \\ j=1}}^{\substack{i=4 \\ j=200}} T_{ij} = [F]$$

The standard deviation was calculated and displayed on PC/DAC monitor in two forms: as an absolute value in degrees F. and as a percent of the T time average.

$$Std. \ Dev. = \sqrt{\frac{1}{4 \times 200} \sum_{\substack{i=1 \\ j=1}}^{\substack{i=4 \\ j=200}} T_{ij}^2 - (T \text{ Time Average})^2} = [F]$$

$$Std. \ Dev. = \frac{\sqrt{\frac{1}{4 \times 200} \sum_{\substack{i=1 \\ j=1}}^{\substack{i=4 \\ j=200}} T_{ij}^2 - (T \text{ Time Average})^2}}{0.01 \cdot T \text{ Time Average}} = [\%]$$

Figure 7:
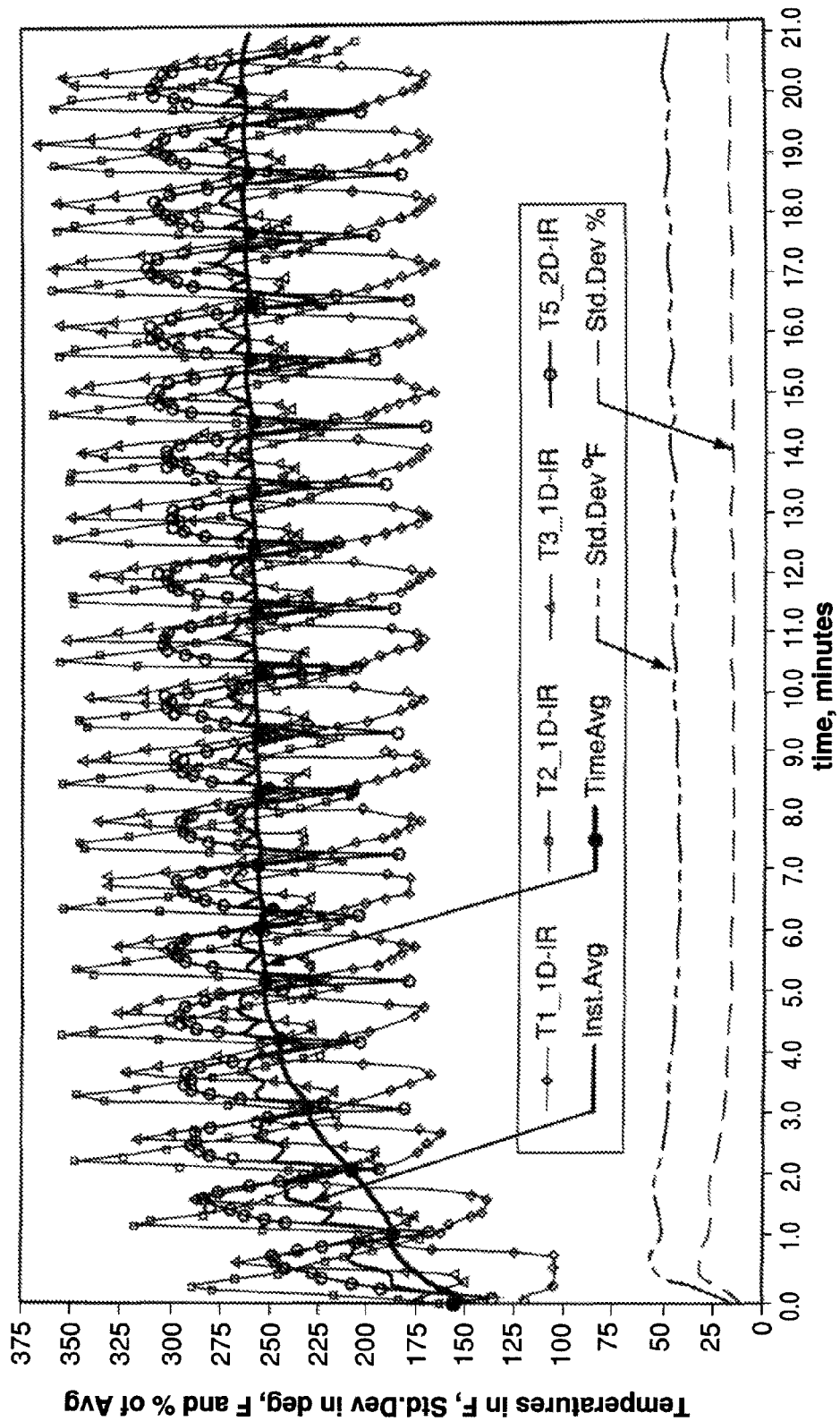
FIG. 7 is a plot of measured and computed temperatures during an HVOF spray coating process including a simultaneous cryogenic cooling of coated surface.

The described spraying and automated cooling operation started only after setting Tmini at 150 deg.F, Tmaxi at 300 deg.F, and preheating the component to 150 deg.F. FIG. 7 shows all measured and calculated values during a 21 minute long component coating process performed under the conditions detailed above. It can be seen that the IR sensors show wide ranges of temperatures due to the effect of HVOF gun traverse and operation of cryo-nozzles and, interestingly, some show peak temperatures while the others show low temperatures at the same snap-shot in time. Nevertheless, the coolant-controlling instant temperature average, Mean (MRR) is consistently narrow, with the typical variation of less than 50 deg. F., and the time average temperature shows almost no thermal variation due to the gun traverse and the coolant on/off flow. Noteworthy, this time average temperature could be used to track the evolution of both the coating material and the substrate temperature, i.e. the temperature of the component material under the freshly deposited coating. Standard deviation calculated during this coating process was at the 50 deg.F level or around 20% of the time averaged temperature value. This level of standard deviation indicates that the thermally induced stresses in the coating and substrate by the HVOF gun and the cryo-cooling nozzles are quite modest, i.e. should not result in micro- or macro-cracking. The evidence of opening and closing of the cryo-cooling valves controlled by the system of present invention can be found at the thermal plot from the brief dips in the instant temperature values.

Examination of the coating produced revealed that it was lighter, i.e. less oxidized than the coating produced with the conventional, forced air cooling. Thus, the use of non-oxidizing, cryogenic nitrogen as the cooling medium offers an additional coating quality improvement.

Very large or long objects may require more IR-sensing units and more coolant discharging nozzles to assure a uniform surface temperature than offered by the unit described in Example 3. The simultaneous use of multiple temperature control and cooling units, each working independently is the most preferred procedure in order to minimize temperature differences between remote areas of such large or long objects during processing.

Example 4

Figure 8:
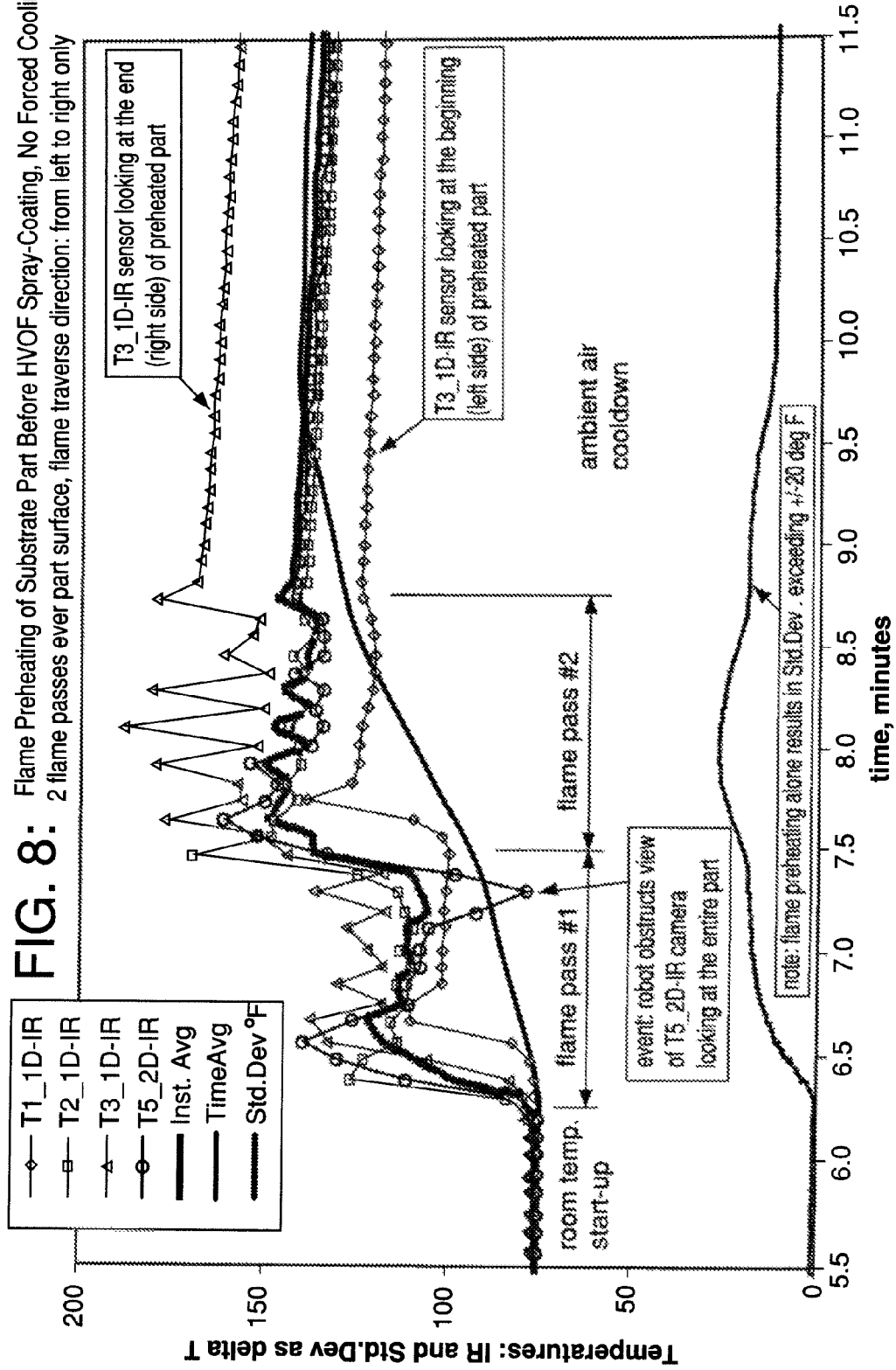
FIG. 8 is a plot of measured and computed temperatures during a flame preheating process of an elongated component.

A thermal treatment system similar to the one shown in FIG. 4 was used without the coolant and without a coolant flow controller to trace temperature evolution during flame preheating of a rotating component. The IR-temperature sensors and calculated temperature and standard deviation values were the same as in Example 3. The objective of this operation was to raise the component or substrate material temperature to about 150 deg.F. As before, the spread between the readings from individual sensors was significant due to their different locations with respect to the flame-heating device at any given point of time, but the average temperatures, both instant and time average showed a logical trend that well reflected the real surface and bulk temperatures of the preheated component. The results of this example are shown in FIG. 8. Interestingly, the standard deviation of temperatures during this preheating operation is larger, i.e. less desired, than in the HVOF spray coating and cryo-cooling operation detailed in Example 3. Elevated standard deviation values revealed during this experiment showed that the further, fully optimized component preheating operations should be carried out using higher rotation speeds (that is, moving at least one of the thermal treatment means or the surface to be treated faster relative to other), e.g. 300 ft/minute instead of 150 ft/minute, and/or higher traverse speeds, e.g. ¼-inch/revolution instead of ⅛-inch/revolution of the flaming device while increasing the number of preheating passes over the component surface. The desired changes in the preheating procedure based on computed standard deviation values could be executed manually, by reprogramming the robot moving the flaming device, or automatically, by feeding the robot controller with new, higher speed values to try to maintain the standard deviation below the desired amount. In this example, the desired standard deviation was less than or equal to 20° F. (+/−20° F.).

Example 5

The coating and cooling process of Example 3 was adopted for an elongated substrate part similar to that shown in FIG. 9. Typical examples of elongated parts are actuator piston rods, airliner landing gear, or long printing rolls, and in all cases, the characteristic main length these parts is many times larger than their characteristic main diameter. Four stationary coolant jetting headers, C1-C4, can be used during the process, each impinging coolant jet cj at the part surface, and as shown, each coolant jet may be designed to impinge on the surface of the workpiece in the zone at which it is directed, or at two adjacent zones (not shown). The length of the part was divided into four zones, z1-z4, corresponding to the number of the coolant headers. The zones are areas of the surface of the workpiece determined for the temperature measuring and temperature control purposes. Such a division is necessary because the traversing HVOF gun, i.e. heat source, cannot affect part temperature in the remote areas as much as in the case of less elongated parts. Consequently, a uniform cooling of the part with coolant headers requires that each header can be controlled individually, i.e. each zone can be controlled and cooled independently. The temperature of each zone should be monitored by at least one non-contact, infra-red (IR) sensor, or a plurality of temperature sensors. As shown in FIG. 9, zone 1 is monitored only by IR sensor IR1 that measures the temperature only in an area within zone 1, but zone 2 is monitored by IR2 and, partly, by an 2-dimensional (2D) thermo-vision camera IR5. Zones 3 is monitored by IR5 and IR3 and Zone 4 is monitored by IR5 and IR4. As disclosed before, overlapping and/or multiple surface measurement areas, f1-f5, in each zone, and also temperature measurement areas that are at least partially within multiple zones provides reliable measurements, avoiding problems with transient blinding of individual IR sensors by HVOF gun, robotic arm, rm, that manipulates the gun, vapors and dust. Stated differently, a plurality of temperature measurements within a zone is desired and so is a plurality of temperature measuring means, to measure those temperatures, as shown for zones 2, 3 and 4. Also, the measurement of the temperature in an area that is at least partially within an adjacent zone, can be used in determining the average temperature for at least one zone that is adjacent to the zone or zones in which that temperature measurement is measured, or for the calculations of the average temperature in the zones in which the temperature measurement is measured, as in the case of the temperature measured by IR5. The process control during coating and cooling of an elongated part presented in FIG. 9 can be set as in Table 1, below which shows the temperature inputs that are used for calculating T instant average for each of the zones shown in FIG. 9. Although IR5 measures temperatures in an area that is within multiple zones, the average temperature measured by IR5 can be used in the T instant average calculation for each of those zones (zones 2, 3 and 4) as shown in Table 1. The temperature T instant average calculated for each zone, is used for controlling coolant flow rate in each of the coolant means, e.g. coolant headers C1-C4 with adjustable coolant flow valves (not shown) and individual controllers (not shown) for each coolant header. The coolant flow rate is controlled based on a comparison between the T instant average measured in a zone and the Tmin and Tmax for the workpiece or for the zone. If the T instant average is not within the Tmin and Tmax, at least one controllable condition as described before is changed by the process and system. For zones having a T instant average temperature within Tmin and Tmax, the flow rate of coolant from the corresponding coolant means to that zone is unchanged. In addition to calculating the T instant average for each of the zones the T time average (or overall average temperature averaging all the measured temperatures in all the zones) and the Standard Deviation continue to be calculated as before, i.e. using all IR sensor inputs, regardless of their zoning. This assures that the substrate part temperature and thermal uniformity of the entire surface are monitored regardless of the zoning, and preventive actions can be taken if their values fall outside preset limits, e.g. acceleration of gun traverse speed (V traverse), and/or an increase in the rotational surface speed (V rotation) which provides an increase in the relative speed of the workpiece surface and the thermal treatment means, and/or increasing the coolant flow rate in one, two or three or all four of the coolant jets shown. The flow rates through each of the coolant jets or headers is individually controllable.

TABLE 1

| Temperature input devices selected to control cooling headers in specific cooling zones: | IR1 | IR2 | IR3 | IR4 | IR5 (2D-camera) | T instant average for controlling coolant headers in specific cooling zones |
|---|---|---|---|---|---|---|
| header C1 in cooling zone z1 | yes | | | | | T(IR1) |

TABLE 1-continued

| Temperature input devices selected to control cooling headers in specific cooling zones: | IR1 | IR2 | IR3 | IR4 | IR5 (2D-camera) | T instant average for controlling coolant headers in specific cooling zones |
|---|---|---|---|---|---|---|
| header C2 in cooling zone z2 | | yes | | | yes | (T(IR2) + T(IR5))/2 |
| header C3 in cooling zone z3 | | | yes | | yes | (T(IR3) + T(IR5))/2 |
| header C4 in cooling zone z4 | | | | yes | yes | (T(IR4) + T(IR5))/2 |

In an alternative embodiment that is not shown in Table 1, the average temperatures measured by IR5 within Zones 3, 4 and 5 may be extracted from the temperatures measured by IR5, or additional individual focused temperature sensors for each zone could have been used to measure temperatures in each of the zones and used to calculate the T instant average for each zone. Further, in an alternative embodiment, one or more temperatures measured in adjacent zones could be used in the calculation of the T instant average for a zone. For example, if there are 2 temperature measurements in each of the zones, then one of the temperature measurements taken in zone 1 and zone 3 could be used in the average temperature calculation for zone 2, along with the 2 temperature measurements for zone 2. The reason for using temperature measurements from adjacent zones in the calculation of a zone's average temperature is because the conductivity of the workpiece and/or a coating will eventually cause the heat or coolness from one zone to reach the adjacent zone.

In summary, the process of the present invention minimizes the stresses between the coating and the substrate of the workpiece developing over the length/width-scale of the entire workpiece and, further, protects the substrate from thermal damage by averaging multi-sensor temperature readings and using this average value to control an optional coolant flow rate, and/or a heating flow rate and/or the relative motion (speed) between the workpiece and the thermal treatment means and/or an cooling or heating means. The process also minimizes local stresses developing between various portions of the workpiece surface due to substrate geometry, non-optimum coolant or heat application, and other, unoptimized parameters of the thermal process by calculating the standard deviation of all temperature readings and bringing this standard deviation value to below some predetermined value or values by either increasing the relative motion speed between the thermal treatment means and the workpiece, and/or adjusting the coolant flow rate and/or heating flow rate, and/or by temporarily suspending or limiting the thermal process. The process and system of the present invention can use both contact and non-contact temperature sensor inputs. The areas or points of these temperature sensors should be distributed over the entire surface of the workpiece to be heated or cooled. For some embodiments, it is beneficial to provide overlapping temperature sensors or multiple temperature sensors that take multiple temperature measurements within the same zones of the workpiece. The process is simple to implement in the industrial production, and assures reliable cooling control in spite of various momentary upsets characterizing thermal treatment operations, even in the case of the most difficult applications involving refrigerated and/or cryogenic coolant media. The process can be used for monitoring and controlling temperature of target surface during treatments involving heating only, without the need for forced cooling with cryogenic or non-cryogenic fluids. The process can be applied to operations of thermal deposition coating, chemical and physical vapor deposition coating, thermal treatment of surface, fusing, hardening, nitriding, carburizing, machining, induction heat-treatment, or laser glazing. Its use enables maximizing thickness of deposition coatings and their adhesion to substrates by minimizing residual stresses in these coatings and substrates coated. Some of the preferred process applications include coating of landing gear, turbine components and other airplane components, land-based turbine and engine components, actuator cylinders, wear-surfaces, heat-facing and heat-shielding surfaces. The process enables coating operators to use thermally-sensitive masking components that wouldn't be acceptable in the conventional practice.

This invention when used for thermal coating operations may accelerate the coating of workpieces by eliminating or reducing the need for cooling breaks, in which the thermal coating gun is not aimed at the workpiece (typically the gun remains on and the coating is wasted) to allow the workpiece to cool. Additionally, for some thermal coating operations of this invention better temperature control will provide less workpiece deformation. For some workpieces less deformation will mean that less coating material will need to be applied to the workpiece, because less post-treatment grinding or machining will be necessary to correct the axiality of the less deformed workpiece. The elimination of the conventional cooling breaks, during which the coating material is wasted, and/or the reduction in the required, as-deposited coating thickness due to less workpiece deformation may improve the deposition efficiency.

If an inert, non-oxidizing gas is used as the cooling medium, e.g. nitrogen, argon, or helium, in the thermal coating process, the resulting coating appears less oxidized. This typically translates into a harder coating when WC-Co type hardfacing coatings are sprayed, or a less brittle and more corrosion resistant coating in the case of Ni-base coating materials.

For embodiments in which inert and/or an inert and cryogenic cooling fluid are not required to minimize coating oxidation, air can be used as a coolant, particularly in processes in which cost is an issue. Alternatively a combination of the conventional, forced air cooling with the cryogenic coolant may be used in a process, and the process may be designed so that only the peak temperatures are cooled by the cryogenic fluid while the substantial portion of the heat is removed by a less costly compressed air stream.

Although most of the description involved examples for deposition coating processes and systems, the invented processes and systems offer control advantages for thermal heating and cooling processes involving surface temperature variations and optionally forced cooling or heating with at least one of various types of coolant fluids or heating devices. Examples include mold and other methods of casting, extrusion metal strip rolling, forging, forming, induction heat treating, joining, brazing, welding, and thermal cutting operations as well as printing and curing of non-metallic materials.

The invention claimed is:
1. A process for treating a workpiece, said process comprising the steps of:
 (a) altering a temperature of a workpiece surface wherein at least one condition is selected from the group consisting of: thermal treatment rate, relative motion between the surface and a thermal treatment means, coolant flow rate onto said surface, heating flow rate onto said surface and the relative speed between a thermal treatment means and the surface is controllable;
 (b) simultaneously measuring temperatures at a plurality of locations over the surface of the workpiece;
 (c) determining an average temperature of the temperatures measured in step (b);
 (d) comparing the average temperature to a preselected minimum temperature and a preselected maximum temperature for the workpiece;
 (e) automatically adjusting at least one of the conditions from step (a) if said average temperature is not between the preselected minimum temperature and the preselected maximum temperature for the workpiece;
 (f) determining the standard deviation between said average temperature and a cumulation of said measured temperatures;
 (g) comparing the standard deviation to a preselected standard deviation, S2; and
 (h) suspending or limiting said altering step if said standard deviation is greater than said preselected standard deviation, S2.

2. The process of claim 1 wherein said altering the temperature of a workpiece step is selected from the group consisting of: thermal spray coating, chemical vapor deposition coating, physical vapor deposition coating, thermally treating, fusing, hardening, nitriding, carburizing, induction heat-treating, laser glazing, heat-facing, heat-shielding, cool rolling and cryogenic treating of a workpiece surface.

3. The process of claim 1 wherein said altering the temperature of a workpiece surface step is selected from the group of: thermal deposition coating a landing gear, thermal deposition coating a turbine component, thermal deposition coating an airplane component, thermal deposition coating a land-based turbine, thermal deposition coating an engine component, thermal deposition coating an actuator cylinder, thermal deposition coating a wear-surface, and thermal deposition coating a component partly covered with thermally-sensitive masking material.

4. The process of claim 1 wherein said adjusting step comprises adjusting said coolant flow rate, wherein said coolant flow rate is a cryogenic coolant flow rate.

5. The process of claim 1 wherein said adjusting step comprises adjusting said coolant flow rate, wherein said coolant flow rate is a forced air coolant flow rate.

6. The process of claim 5 wherein said adjusting step further comprises adjusting said coolant flow rate, wherein said coolant flow rate is a cryogenic coolant flow rate.

7. The process of claim 1 wherein said adjusting step further comprises adjusting the heating flow rate.

8. The process of claim 1 wherein said altering the temperature of a workpiece step is selected from the group consisting of molding, casting, extrusion metal strip rolling, forging, forming, induction heat treating, joining, brazing, welding, thermal cutting operations, and printing and curing of non-metallic materials.

9. The process of claim 1 wherein said adjusting step comprises adjusting the coolant flow rate from at least one of multiple separately controllable coolant flow devices.

10. A process for treating a workpiece, said process comprising the steps of:
 (a) altering the temperature of a workpiece surface wherein at least one condition selected from the group of: thermal treatment rate, relative motion between the surface and said thermal treatment means, coolant flow rate onto said surface, heating flow rate onto said surface and the relative speed between the thermal treatment means and the surface is controllable;
 (b) dividing the surface of the workpiece into a plurality of zones over the length of the workpiece;
 (c) simultaneously measuring temperatures at a plurality of locations in a plurality of zones over the surface of the workpiece wherein at least one temperature is measured in each zone;
 (d) determining an average temperature in each of said plurality of zones using said temperatures measured in step (c);
 (e) comparing each of the average temperatures to a preselected minimum temperature and a preselected maximum temperature for the zone; and
 (f) automatically adjusting at least one of the conditions from step (a) if said average temperature is not between the preselected minimum temperature and the preselected maximum temperature for at least one of the zones.

11. The process of claim 10 wherein said automatically adjusting step further comprises separately adjusting the coolant flow rate in any said zone for which said average temperature is not between the preselected minimum temperature and the preselected maximum temperature for that zone.

12. The process of claim 10 wherein said measuring step is performed by at least one temperature sensor that measures temperatures at locations in at least two zones.

13. The process of claim 10 wherein said measuring step is performed by at least two temperature sensors that measure temperatures in one of said zones.

14. The process of claim 10 wherein the determining step for at least one zone averages at least one temperature measured in an area within said zone and at least one temperature measured in an area that is at least partially within an adjacent zone.

15. The process of claim 1 further comprising the steps of:
 (i) repeating steps (b) through (g) if said standard deviation is greater than said preselected standard deviation, S2 until said standard deviation is less than said preselected standard deviation, S2, and then repeating steps (a) through (i).

16. The process of claim 15 further comprising the steps of:
 (j) comparing the standard deviation to a first preselected standard deviation, S1;
 (k) adjusting at least one of the conditions from step (a) if said standard deviation is greater than a first preselected standard deviation, S1; and
 (l) repeating steps (a) through (l) at least once or until said process for treating said workpiece is complete.

17. The process of claim 10 further comprising the steps of:
 (g) determining an overall average temperature using the average temperatures for the zones;
 (h) determining the standard deviation between said overall average temperature and a cumulation of said measured temperatures;

(i) comparing the standard deviation to a first preselected standard deviation, S1;
(j) adjusting at least one of the conditions from step (a) if said standard deviation is greater than a first preselected standard deviation, S1; and
(k) repeating steps (a) through (i) at least once or until said process for treating said workpiece is complete.

18. The process of claim 10 further comprising the steps of:
(g) determining an overall average temperature using the average temperatures for the zones;
(h) determining the standard deviation between said overall average temperature and a cumulation of said measured temperatures;
(i) comparing the standard deviation to a second preselected standard deviation, S2;
(j) suspending or limiting said altering step if said standard deviation is greater than said second preselected standard deviation, S2; and repeating steps (b) through (j) until said standard deviation is less than said second preselected standard deviation, S2;
(k) comparing the standard deviation to a first preselected standard deviation, S1;
(l) adjusting at least one of the conditions from step (a) if said standard deviation is greater than a first preselected standard deviation, S1; and
(m) repeating steps (a) through (l) at least once or until said treatment process of said workpiece is complete.

19. A system comprising:
a. a thermal treatment means for altering a temperature of a surface of a workpiece and a controller for said thermal treatment means;
b. workpiece holder for holding a workpiece,
c. motion controller for moving said workpiece holder relative to said thermal treatment means;
d. at least one temperature sensor that can simultaneously measure temperatures at a plurality of locations over a surface of a workpiece in a plurality of zones; and
e. a computer having a control program that receives the input from the at least one temperature sensor and determines an average temperature for each zone; compares the average temperature to a preselected minimum temperature and a preselected maximum temperature for the workpiece; automatically communicates with said motion controller if said average temperature in any of the zones is not between the preselected minimum temperature and the preselected maximum temperature for the workpiece, wherein said control program is operationally configured to determine a standard deviation between said average temperature and a cumulation of said measured temperatures and to compare said standard deviation to a preselected standard deviation.

20. The system of claim 19 further comprising at least one cooling means for air and at least one cooling means for a cryogenic fluid.

21. The system of claim 19 further comprising a plurality of cooling means and a plurality of individual controllers for said cooling means, and at least one of said cooling means directs coolant at a corresponding zone of a surface of a workpiece.

22. The system of claim 19 further comprising a plurality of temperature sensors for at least one zone.

23. The system of claim 22 further comprising at least one individually controllable cooling means controlled by said computer for cooling a corresponding zone.

24. The system of claim 19, wherein said control program automatically communicates with said motion controller if said standard deviation is greater than said preselected standard deviation.

25. The system of claim 19, wherein said control program is operationally configured to compare received temperatures from adjacent zones among said plurality of zones and to account for heat conductivity of said workpiece.

* * * * *